United States Patent
Murayama et al.

(10) Patent No.: US 8,792,149 B2
(45) Date of Patent: Jul. 29, 2014

(54) IMAGE FORMING APPARATUS

(75) Inventors: Kentaro Murayama, Kasugai (JP); Osamu Takahashi, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 601 days.

(21) Appl. No.: 13/072,736

(22) Filed: Mar. 27, 2011

(65) Prior Publication Data

US 2011/0317182 A1 Dec. 29, 2011

(30) Foreign Application Priority Data

Jun. 28, 2010 (JP) ................................. 2010-146571

(51) Int. Cl.
*G03F 3/08* (2006.01)
*H04N 1/60* (2006.01)
*G06K 9/00* (2006.01)

(52) U.S. Cl.
USPC ............................. 358/518; 358/1.9; 382/167

(58) Field of Classification Search
None
See application file for complete search history.

(56) References Cited

U.S. PATENT DOCUMENTS

| | | | | |
|---|---|---|---|---|
| 5,041,866 A * | 8/1991 | Imoto | | 355/38 |
| 5,276,459 A * | 1/1994 | Danzuka et al. | | 346/33 A |
| 5,561,536 A * | 10/1996 | Sugiura et al. | | 358/500 |
| 6,335,747 B1 | 1/2002 | Munakata | | |
| 7,460,284 B2 * | 12/2008 | Hiromatsu | | 358/518 |
| 7,499,193 B2 * | 3/2009 | Nishikawa | | 358/1.9 |
| 8,537,380 B2 * | 9/2013 | Yamada | | 358/1.14 |
| 8,582,993 B2 * | 11/2013 | Murayama et al. | | 399/49 |
| 2002/0080375 A1 * | 6/2002 | Waldner et al. | | 358/1.9 |
| 2003/0063917 A1 * | 4/2003 | Shinohara | | 399/49 |
| 2003/0174886 A1 * | 9/2003 | Iguchi et al. | | 382/167 |
| 2003/0202192 A1 * | 10/2003 | Kuwata et al. | | 358/1.9 |
| 2005/0105401 A1 * | 5/2005 | Akahane et al. | | 368/187 |
| 2005/0254864 A1 * | 11/2005 | Koide | | 399/299 |
| 2007/0024662 A1 * | 2/2007 | Arazaki | | 347/19 |
| 2007/0070424 A1 * | 3/2007 | Chiwata | | 358/3.03 |

(Continued)

FOREIGN PATENT DOCUMENTS

| | | |
|---|---|---|
| CN | 101403875 A | 4/2009 |
| JP | H08-262829 A | 10/1996 |

(Continued)

OTHER PUBLICATIONS

Mukai, Kenichi—Image forming apparatus—Apr. 8, 2010—English Translation of JP 2010-079125.*

(Continued)

*Primary Examiner* — Madelein A Nguyen
(74) *Attorney, Agent, or Firm* — Baker Botts L.L.P.

(57) ABSTRACT

An image forming apparatus includes an automatic acquiring unit which forms a mark for detecting at least one of positional deviation and density deviation and acquire a degree of deviation by measuring the mark, a manual acquiring unit which receives a user input to acquire a correction value; an image forming unit which forms an image based on an actual correction value determined by an automatic correction value specified based on the degree of deviation and a manual correction value which is the correction value acquired by the manual acquiring unit, and a changing unit which executes at least one of a first changing process of applying a weight to at least one of the automatic correction value and the manual correction value and the second changing process of changing at least one of the automatic correction value and the manual correction value into a past correction value.

20 Claims, 8 Drawing Sheets

(56) References Cited

U.S. PATENT DOCUMENTS

| | | | |
|---|---|---|---|
| 2007/0081721 A1* | 4/2007 | Xiao et al. | 382/167 |
| 2007/0172245 A1 | 7/2007 | Yoshida et al. | |
| 2007/0230976 A1* | 10/2007 | Takahashi | 399/35 |
| 2007/0247680 A1* | 10/2007 | Nakane et al. | 358/521 |
| 2009/0087760 A1 | 4/2009 | Kushida | |
| 2009/0136251 A1* | 5/2009 | Fukushi | 399/74 |
| 2009/0231644 A1* | 9/2009 | Fukuhara | 358/518 |
| 2010/0074638 A1* | 3/2010 | Murayama | 399/31 |
| 2010/0110459 A1* | 5/2010 | Yamada | 358/1.9 |
| 2010/0134813 A1* | 6/2010 | Yamazaki | 358/1.9 |
| 2011/0043838 A1* | 2/2011 | Yamada et al. | 358/1.9 |
| 2011/0211853 A1* | 9/2011 | Yamada et al. | 399/49 |
| 2011/0317175 A1* | 12/2011 | Murayama et al. | 358/1.2 |

FOREIGN PATENT DOCUMENTS

| | | |
|---|---|---|
| JP | H11-119504 A | 4/1999 |
| JP | H11-218989 A | 8/1999 |
| JP | 2001-109218 A | 4/2001 |
| JP | 2002-244393 A | 8/2002 |
| JP | 2006-159890 A | 6/2006 |
| JP | 2010-079125 A | 4/2010 |
| JP | 2010-128101 A | 6/2010 |

OTHER PUBLICATIONS

The State Intellectual Property Office of the People's Republic of China, Notification of First Office Action for Chinese Application No. 201110079901.0 (counterpart to the above-captioned application), mailed Jul. 30, 2013.

Japan Patent Office, Notification of Reasons for Refusal for Japanese Patent Application No. 2010-146571 (counterpart to above-captioned patent application), mailed Jun. 11, 2013.

Japan Patent Office, Notification of Reasons for Refusal for Japanese Patent Application No. 2010-146571 (counterpart to the above-captioned application), mailed Apr. 1, 2014.

\* cited by examiner

| AUTOMATIC CORRECTION VALUE | MANUAL CORRECTION VALUE |
|---|---|
| +3 | -2 |
| +4 | -1 |
| +2 | +2 |
| +3 | 0 (INITIAL VALUE) |
| +2 | |
| +3 (INITIAL VALUE) | |

341

IMAGE FORMING APPARATUS

CROSS-REFERENCE TO RELATED APPLICATION

This application claims priority from Japanese Patent Application No. 2010-146571, filed on Jun. 28, 2010, the entire subject matter of which is incorporated herein by reference.

TECHNICAL FIELD

Aspects of the present invention relate to an image forming apparatus that forms a mark for image adjustment and adjusts a position or density of an image based on at least one of a correction value obtained by detection of the mark and a correction value input by a user.

BACKGROUND

An image forming apparatus performs an image adjustment so that a position or density of an image is not deviated. A sequence of such image adjustment includes, for example, forming a registration pattern, which is a mark for adjusting positional deviation, on a belt member for sheet conveyance for each of colors, acquiring a degree of deviation between the registration pattern of a basic color and the registration pattern of a detection target color and correcting positional deviation of an image of the detection target color based on a correction value specified based on the degree of deviation.

A correction value may be input by a user. For example, JP-A-2002-244393 describes a method of using both a correction value input by a user (manual correction value) and a correction value obtained by detection of a registration pattern (automatic correction value) to correct positional deviation of each color image in a color image.

SUMMARY

However, the above image forming apparatus has a following problem. That is, in the image forming apparatus that uses both the manual correction value and the automatic correction value to calculate an actual correction value, which is a final correction value, and performs the image adjustment based on the actual correction value, it is difficult to adjust the actual correction value. For example, when a quality of an output image is poor (i.e., when the actual correction value is problematic), it is difficult to specify whether the problematic factor of the actual correction value is in the manual correction value or automatic correction value, and therefore, it is difficult to appropriately correct the actual correction value.

Accordingly, it is an aspect of the present invention to provide an image forming apparatus that uses both a manual correction value and an automatic correction value to calculate an actual correction value for image adjustment and can easily correct the actual correction value.

According to an illustrative embodiment of the present invention, there is provided an image forming apparatus comprising: an automatic acquiring unit which is configured to form a mark for detecting at least one of positional deviation and density deviation and acquire a degree of deviation by measuring the mark; a manual acquiring unit which is configured to receive a user input and acquire a correction value based on the user input; an image forming unit which is configured to form an image based on an actual correction value, wherein the actual correction value is determined based on an automatic correction value which is specified based on the degree of deviation acquired by the automatic acquiring unit and a manual correction value which is the correction value acquired by the manual acquiring unit; and a changing unit which is configured to execute at least one of a first changing process and the second changing process, the first changing process including applying a weight to at least one of the automatic correction value and the manual correction value, the second changing process including changing at least one of the automatic correction value and the manual correction value into a past correction value.

According to the above-described configuration, there is provided an image forming apparatus that uses both a manual correction value and an automatic correction value to calculate an actual correction value for image adjustment and can easily correct the actual correction value.

BRIEF DESCRIPTION OF THE DRAWINGS

The above and other aspects of the present invention will become more apparent and more readily appreciated from the following description of illustrative embodiments of the present invention taken in conjunction with the attached drawings, in which.

DETAILED DESCRIPTION

Hereinafter, an image forming apparatus and an image forming system according to illustrative embodiments will be described with reference to the accompanying drawings. In the illustrative embodiments, the present invention is applied to a multi function peripheral (MFP) having a color printing function.

[Configuration of MFP]

Figure 1:
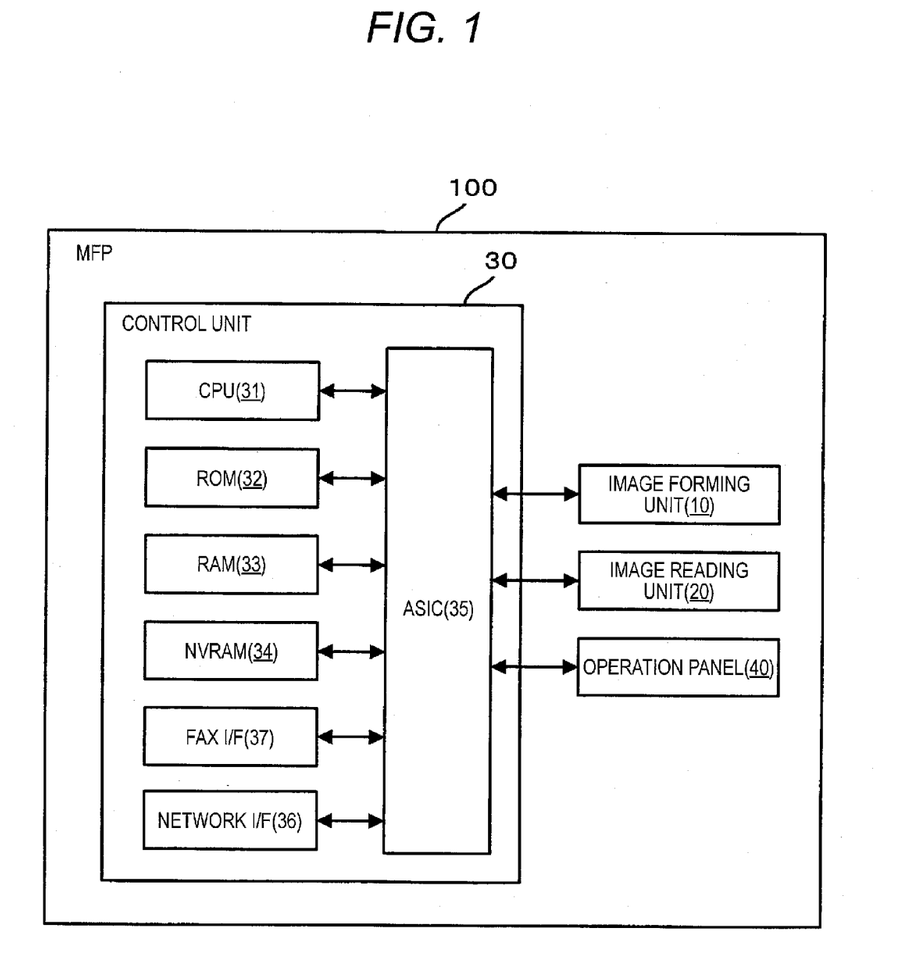
FIG. 1 is a block diagram showing an electrical configuration of an MFP.

As shown in FIG. 1, an MFP 100 of this illustrative embodiment includes a control unit 30 having a CPU 31, a ROM 32, a RAM 33, an NVRAM (non-volatile RAM) 34, an ASIC 35, a network interface 36 and a FAX interface 37. In addition, the control unit 30 is electrically connected to an image forming unit 10 that forms an image on a sheet, an image reading unit 20 that reads out an image of a sheet and an operation panel 40 that displays an operation situation and receives an input operation by a user.

The CPU 31 executes operations for implementing various functions such as an image reading function, an image forming function, a FAX data transmission/reception function and an image adjustment function (described later), and functions as a center of control. The ROM 32 stores therein various control programs for controlling the MFP 100, various settings, initial values and the like. The RAM 33 is used as a work area from which the various control programs are read out or a storage area that temporarily stores image data. The NVRAM 34 is a non-volatile storage device and is used as a storage area that preserves various settings, image data and the like.

Based on the control programs read out from the ROM 32 or signals transmitted from various sensors, the CPU 31 controls the respective constitutional elements of the MFP 100 (for example, a turn-on timing of an exposure device configuring the image forming unit 10, driving motors of various rollers configuring a conveyance path of a sheet and a moving motor of an image sensor unit configuring the image reading unit 20) through the ASIC 35 while storing results of the processing in the RAM 33 or NVRAM 34.

The network interface 36 is connected to a network and enables connection with the other information processing apparatuses. The FAX interface 37 is connected to a telephone line and enables connection with a FAX apparatus of the other party. The MFP 100 performs data communication with an external apparatus through the network interface 36 or FAX interface 37.

[Configuration of Image Forming Unit]

Figure 2:
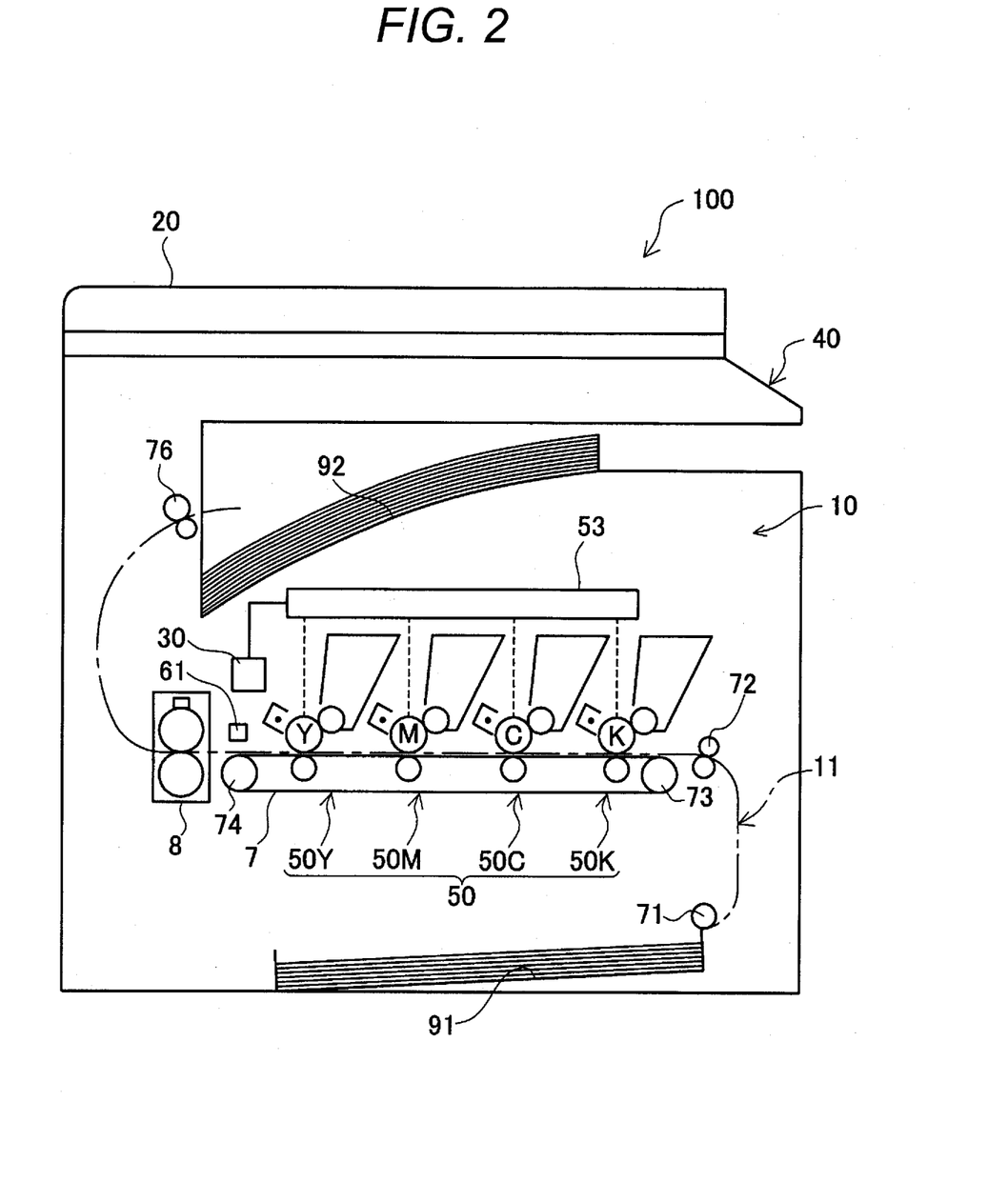
FIG. 2 shows a schematic configuration of an image forming unit of the MFP shown in FIG. 1.

Next, a configuration of the image forming unit 10 of the MFP 100 will be described with reference to FIG. 2. The image forming unit 10 has a process unit 50 that forms a toner image by an electro-photographic method and transfers the toner image on a sheet, a fixing device 8 that fixes unfixed toner on the sheet, a sheet feeding tray 91 that accommodates sheets therein before the image transfer and a sheet discharge tray 92 which receives sheets thereon after the image transfer. The image reading unit 20 is arranged above the image forming unit 10.

The image forming unit 10 has an exposure device 53 that illuminates light to the respective process units 50Y, 50M, 50C, 50K, a conveyance belt 7 that conveys a sheet to transfer positions of the respective process units 50Y, 50M, 50C, 50K and a mark sensor 61 that detects a pattern image formed on the conveyance belt 7.

In addition, the image forming unit 10 is provided therein with a conveyance path 11 (one dotted and dashed line in FIG. 2) having a substantial S shape so that the sheet accommodated in the sheet feeding tray 91 positioned at a bottom passes through a feeder roller 71, registration rollers 72, the process unit 50 and the fixing device 8 and is then guided to the sheet discharge tray 92 through sheet discharge rollers 76.

The process unit 50 can form a color image and includes the process units corresponding to respective colors of yellow (Y), magenta (M), cyan (C) and black (K) in parallel. Specifically, the process unit 50 has the process unit 50Y that forms an image of a Y color, the process unit 50M that forms an image of an M color, the process unit 50C that forms an image of a C color and the process unit 50K that forms an image of a K color. The respective process units 50Y, 50M, 50C, 50K are arranged at a predetermined interval in a conveyance direction of the sheet.

In the process unit 50, a surface of a photosensitive member is uniformly charged by a charging device. Then, the photosensitive member is exposed by the light from the exposure device 53 and an electrostatic latent image corresponding to an image formed on a sheet is thus formed on the photosensitive member. Then, toner is supplied to the photosensitive member through a developing device. Thereby, the electrostatic latent image on the photosensitive member becomes a visible image as a toner image.

The conveyance belt 7 is an endless belt member that is wound around the conveyance rollers 73, 74 and is made of a resin material such as polycarbonate and the like. The conveyance belt 7 is rotated in a counterclockwise direction as the conveyance roller 74 is rotated. Thereby, the sheet put on the conveyance belt is conveyed from the registration rollers 72 toward the fixing device 8.

The image forming unit 10 picks up the sheets accommodated in the sheet feeding tray 91 one by one and conveys the sheet onto the conveyance belt 7. Then, the image forming unit 10 transfers the toner image formed in the process unit 50 to the sheet. At this time, for a case of a color printing, toner images are formed by the respective process units 50Y, 50M, 50C, 50K and are then overlapped with each other on the sheet. In the meantime, for a case of a monochrome printing, a toner image is formed only by the process unit 50K and is then transferred on the sheet. Thereafter, the sheet on which the toner images are transferred is conveyed to the fixing device 8 and is then heat-fixed on the sheet. Then, the sheet after the fixing is discharged to the sheet discharge tray 92.

The mark sensor 61 is provided downstream from the process units 50Y, 50M, 50C, 50K and upstream from the fixing device 8 with respect to the conveyance direction of the sheet and detects a pattern for image adjustment formed on the conveyance belt 7.

Figure 3:
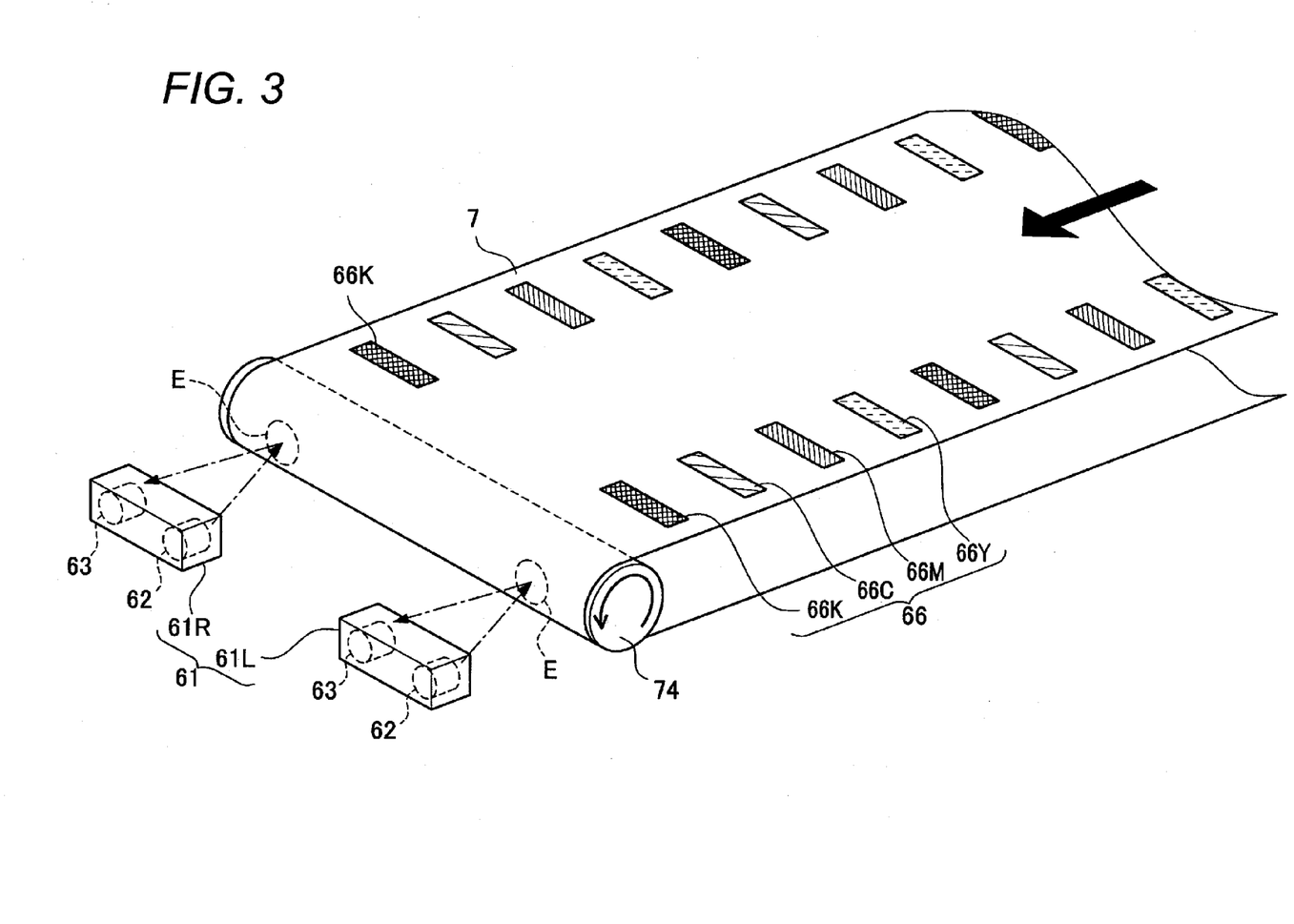
FIG. 3 shows an arrangement of mark sensors.

Specifically, as shown in FIG. 3, the mark sensor 61 includes two sensors, i.e., a sensor 61R that is arranged at a right side of a width direction of the conveyance belt 7 and a sensor 61L that is arranged at a left side thereof. Each of the sensors 61R, 61L is a reflection-type optical sensor having a pair of a light emitting element 62 (for example, LED) and a light receiving element 63 (for example, photo transistor). The mark sensor 61 illuminates light to a surface (dotted ranges E in FIG. 3) of the conveyance belt 7 in an oblique direction by the light emitting elements 62 and receives the light by the light receiving elements 63, respectively. The mark sensor can detect a mark 66 for image adjustment (mark 66 of FIG. 3 is an example of a mark for positional deviation correction) by a difference between an amount of reflection light received when the mark for image adjustment passes and an amount of reflection light received that is directly received from the conveyance belt 7.

[Image Adjustment in MFP]

Next, the image adjustment in the MFP 100 will be described. In the MFP 100, regarding the image adjustment, a positional deviation correction that adjusts positions of images of the respective colors and a density deviation correction that adjusts densities of the respective colors are performed. Both image adjustments include an acquiring process of acquiring degrees of deviation of adjustment colors from a reference color and acquiring correction values specified by the degrees of deviation and a correcting process of correcting an image based on the correction values. Hereinafter, the image adjustment will be described with reference to the positional deviation correction.

First, the acquiring process of the positional deviation correction will be described. The MFP 100 has two modes of acquiring process, which includes an automatic correction and a manual correction. The automatic correction is to adjust an image to an ideal position that is set for the MFP 100. The manual correction is to reflect a user's preference or to substitute for the automatic correction when the automatic correction does not function properly.

In the automatic correction, a registration pattern that is a pattern image for detecting a degree of positional deviation and the mark sensor 61 detects the registration pattern and thus calculates a degree of deviation. A correction value based on the degree of deviation is automatically acquired. In the manual correction, a user inputs a numerical value through the operation panel 40, so that a correction value is manually acquired.

Here, a sequence of acquiring the correction value in the automatic correction will be described. First, when a predetermined execution condition is satisfied, registration patterns for positional deviation correction are formed by the respective process units 50Y, 50M, 50C, 50K. The execution condition is determined based on an elapsed time period after a previous acquiring process, the number of printed pages, environmental changes such as temperature and humidity and a remaining amount of toner, for example.

Specifically, as shown in FIG. 3, the registration pattern 66 includes a mark group which has a mark 66K formed by the process unit 50K, a mark 66C formed by the process unit 50C, a mark 66M formed by the process unit 50M and a mark 66Y formed by the process unit 50Y, which are arranged in a sub-scanning direction.

The registration pattern 66 is formed at a constant interval in the sub-scanning direction (a moving direction of the conveyance belt 7 shown in FIG. 3). Each of the marks 66K, 66C, 66M, 66Y has a rectangular rod shape and is long in a main scanning direction (direction perpendicular to the sub-scanning direction).

Next, based on digitized signals output from the mark sensor 61, positions of the respective marks 66K, 66Y, 66M, 66C are detected. Then, intervals of marks (for example, marks 66C, 66M, 66Y) of respective adjustment colors relative to a mark of a reference color (for example, mark 66K) in the sub-scanning direction are respectively calculated. The intervals between the mark of the reference color and the adjustment colors are changed when positional deviation occurs in the sub-scanning direction. Therefore, it is possible to specify a degree of deviation of the adjustment color relative to the reference color in the sub-scanning direction. Based on the degree of deviation, a correction value by the automatic correction (hereinafter, referred to as "automatic correction value") is calculated. The automatic correction values are stored in the NVRAM 34.

It is noted that the configuration of the registration pattern 66 is just illustrative and is not limited to the above. The registration pattern may be a general image pattern that is used to correct the positional deviation. For example, the registration pattern may include a pair of two rod-shaped marks wherein at least one is inclined by a predetermined angle to a straight line following the main scanning direction. Such registration pattern can specify a degree of deviation in the main scanning direction as well as in the sub-scanning direction.

In the meantime, the manual correction is executed by a user's operation. The operation panel 40 is provided with a switch button for switching into a manual correction mode that enables an input of a correction value. A user pushes the switch button, inputs a desired correction value and then pushes an OK button. When the OK button is pushed, the MFP 100 acquires the input value to release the manual correction mode. Based on the input value, a correction value by the manual correction (hereinafter, referred to as "manual correction value") is calculated. The manual correction value is stored in the NVRAM 34.

The MFP 100 has a pattern printing function of printing a pattern image that is referred to when a user inputs a correction value. As the pattern image, a mark group as shown in FIG. 4A or 4B (hereinafter, referred to as "pattern image 86") is printed.

Figure 4A:
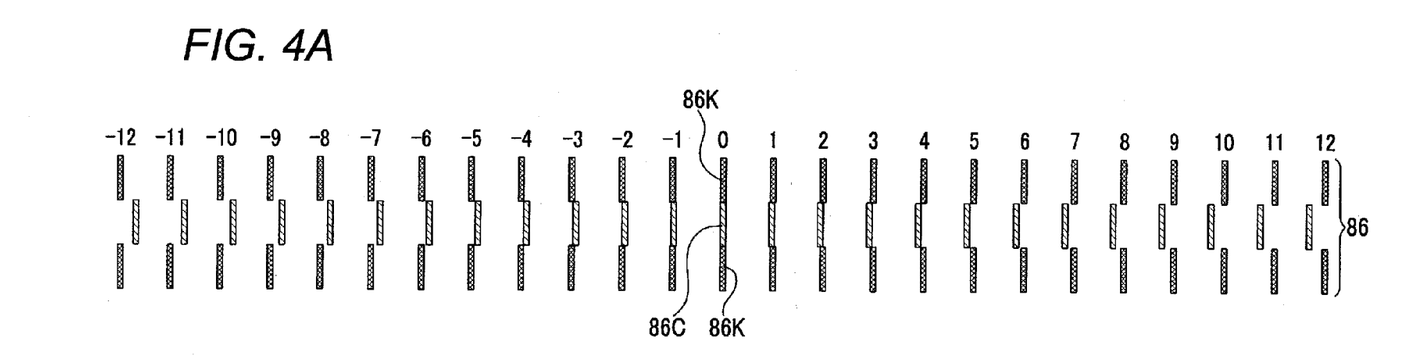
FIGS. 4A and 4B show a printing example of a pattern image.

In the pattern image 86 of this illustrative embodiment, marks of the same color having a rectangular rod shape are formed at a constant interval in the main scanning direction (horizontal direction in FIG. 4A). In the example of FIG. 4A, the reference color is black (K color) and the adjustment color is cyan (C color) and an interval of the marks 86C of the adjustment color are narrower than that of the marks 86K of the reference color by N dots (N is natural number and N=1 in this illustrative embodiment). The marks 86K of the reference color are formed as the number (25 in FIGS. 4A and 4B) corresponding to a permissible range of the manual correction value for the adjustment color and numbers (−12 to 12 in FIG. 4) corresponding to the permissible range are added in ascending order from the left. The marks 86C of the adjustment color is the same as the number of the marks of the reference color and a zero mark is printed so that its position of the main scanning direction is matched with a zero mark of the reference color. FIG. 4A shows a case where positional deviation does not occur and the mark of the reference color and the mark of the adjustment color are matched at a zero position.

Figure 4B:
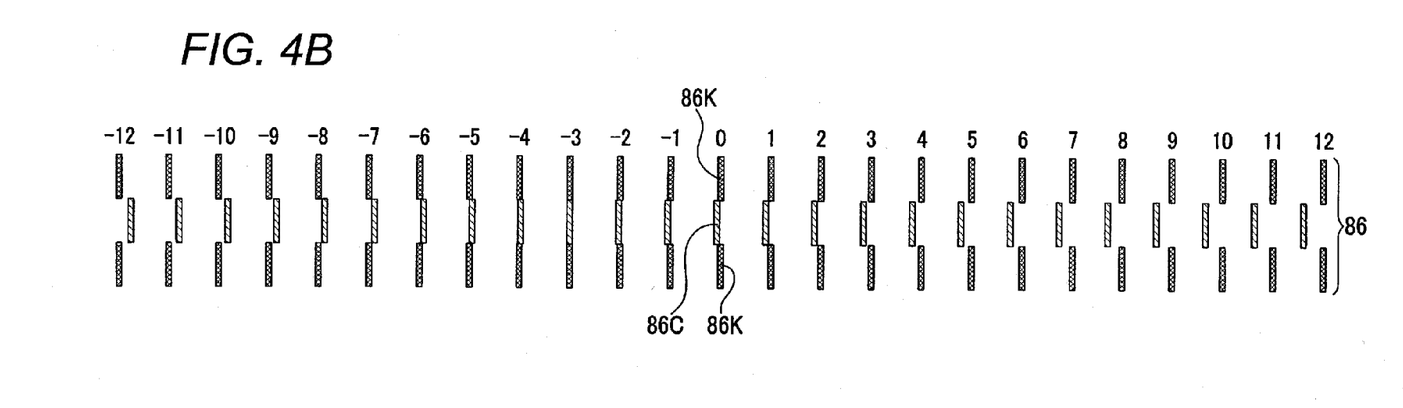

FIG. 4B shows a printing example where positional deviation occurs by 3 dots to the left. In this case, the mark of the reference color and the mark of the adjustment color are not matched at the zero position and are matched at −3 position. Thereby, a user can recognize that positional deviation of 3 dots occurs in the left. In this case, the user can adjust the positional deviation of the C color by inputting '3' as a correction value. When positional deviation of 3 dots occurs in the right, the user inputs '−3' as a correction value. In this illustrative embodiment, the K color is the reference color and the user can also input correction values for the M and Y colors in the same manner, in addition to the C color.

In the meantime, the configuration of the pattern image 86 is just illustrative and is not limited to the above. The pattern image may be a general image pattern that is used to correct the positional deviation. For example, the mark group including the pattern image 86 is formed at a constant interval in the sub-scanning direction (vertical direction in FIG. 4A), so that a user can check the positional deviation of the sub-scanning direction.

The printing of the pattern image 86 is executed when the switch button is pushed. Accordingly, a user can determine a correction value by referring to the sheet on which the pattern image 86 is printed. In the meantime, it may be also possible that the operation panel 40 is provided with a button for printing a pattern image and a user prints the pattern image 86 at any timing.

In the correction process, an actual correction value is determined by using the automatic correction value and the manual correction value, which are stored in the NVRAM 34. Based on the actual correction value, process conditions (for example, exposure position, speed of the conveyance belt 7 or photosensitive member) of the adjustment color are adjusted so that a position of an image of the adjustment color is matched with a position of an image of the reference color.

In the meantime, the density deviation adjustment also includes the automatic correction and the manual correction. For example, in the automatic correction, density patterns having density differences in the sub-scanning direction are formed by the respective process units 50Y, 50M, 50C, 50K. Then, amounts of reflected light from the density patterns are detected by the common sensor to the positional deviation correction or another optical sensor. In this illustrative embodiment, the detection is performed by the sensor 61L, for example. According to the amounts of reflected light, the densities are specified and differences with a target density are calculated as automatic correction values. In the manual correction, a manual correction value can be received through a user input. Then, in the correction process, an actual correction value is calculated based on the correction values, and the process conditions (for example, exposure intensity, exposure range and developing bias) of the respective colors are adjusted to maintain a target density based on the actual correction value.

[Sequence of Changing Correction Value]

Next, a process of changing the automatic and manual correction values will be described. The MFP 100 can change the automatic correction value and the manual correction value, which are stored in the NVRAM 34, by another way than the process of updating the correction values by the above-described acquiring processes for the respective correction values. Specifically, the MFP 100 has an automatic changing function of automatically changing the correction values by the MFP 100 itself and a manual changing function of changing the correction values by a user's instruction.

First Illustrative Embodiment

The first illustrative embodiment relates to the automatic changing function. In the automatic changing function, when an inappropriate degree of positional deviation is acquired during the acquiring process of the automatic correction value, the manual correction value is automatically changed.

[Automatic Correction Process]

Figure 5:
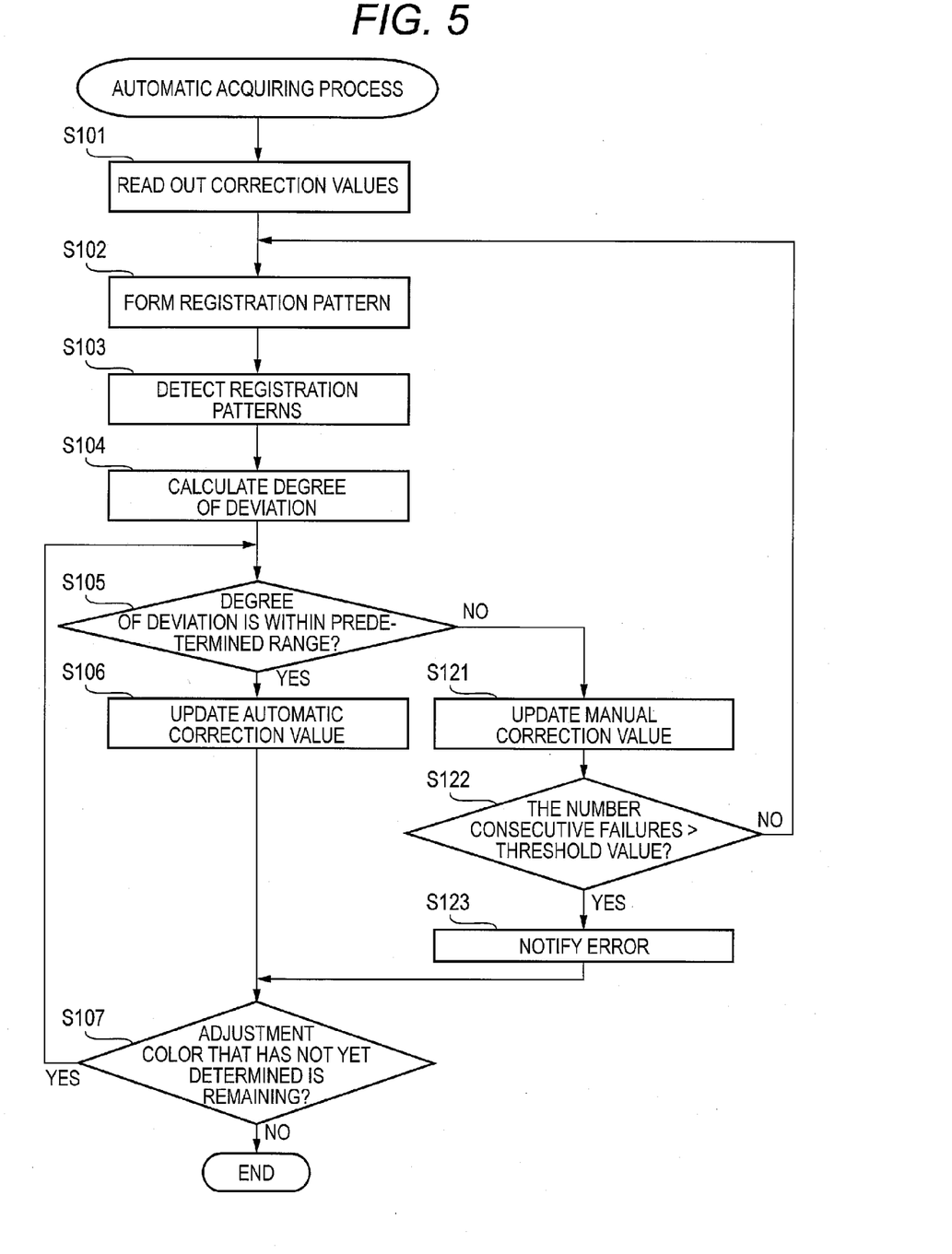
FIG. 5 is a flow chart showing a sequence of an automatic acquiring process according to a first illustrative embodiment.

First, a sequence of an automatic acquiring process that is an acquiring process for automatic correction will be described with reference to a flow chart of FIG. 5. The automatic acquiring process is executed by the CPU 31 when a predetermined execution condition for automatic correction is satisfied.

The automatic correction value and the manual correction value are read out from the NVRAM 34 (S101). The MFP 100 stores, as an initial degree of deviation, a degree of positional deviation before shipment from a factory in the ROM 32. The initial degree of deviation is a degree of positional deviation that is inherent to an apparatus measured for each apparatus when manufacturing the apparatus and is stored in the ROM 32 before shipment. The initial degree of deviation is set as the initial value of the automatic correction value. In other words, the automatic correction value is a value having the initial degree of deviation added thereto. In the meantime, zero is set as an initial value of the manual correction value.

Then, the registration pattern 66 is formed on the conveyance belt 7 by using the automatic correction value and the manual correction value, which are read out in S101 (S102). Then, the mark sensor 61 detects the registration pattern 66 (S103). Then, the degrees of positional deviation of the respective adjustment colors are calculated based on signals from the mark sensor 61 (S104).

Then, it is determined whether the degree of positional deviation of each adjustment color, which is obtained in S104, is within a predetermined range (S105). The predetermined range is a range within which the positional deviation can be adjusted and which is stored in the ROM 32 in advance. For example, the case where the degree of positional deviation exceeds the predetermined range may be a case where the degree of positional deviation is so large that the adjacent marks are overlapped with each other. This kind of large degree of positional deviation could be caused by an error input of the manual correction value by a user, for example. In addition, when the conveyance belt 7 has a damaged part and the mark sensor 61 falsely detects the damaged part as a mark, an inappropriate degree of positional deviation can be caused. Also, if the mark sensor 61 is out of order, even the degree of positional deviation itself can not be acquired.

For an adjustment color having a degree of positional deviation that is within the predetermined range (S105: YES), the automatic correction value corresponding to the adjustment color is updated (S106). Specifically, the degree of positional deviation obtained in S104 is added to the current automatic correction value, and the result is stored in the NVRAM 34 as a new automatic correction value.

In the meantime, for an adjustment color having a degree of positional deviation that exceeds the predetermined range (S105: NO), the manual correction value corresponding to the adjustment color is changed (S121). In this illustrative embodiment, the manual correction value of the adjustment color which has a degree of positional deviation that exceeds the predetermined range is multiplied by the weight of 0.5, such that the manual correction value becomes closer to zero. In the meantime, the weight that is applied to the manual correction value is not limited to 0.5. That is, any weight can be used inasmuch as it reduces a weight of the manual correction value relative to the automatic correction value. For example, the manual correction value may be returned to zero that is the initial value thereof.

After that, it is determined whether the number of consecutive failures is greater than a threshold value (S122). When the number of consecutive failures is smaller than or equal to the threshold value (S122: NO), the process is returned to S102. Then, a registration pattern is formed again by using the manual correction value changed in S121 and a degree of positional deviation is calculated again. That is, the degree of positional deviation is re-calculated while the weight of the manual correction value is reduced. In the meantime, when the number of consecutive failures is greater than the threshold value (S122: YES), an error notification is issued, which indicates that acquisition of the automatic correction value is failed (S123). The notification may be message display on a display unit of the operation panel 40, or generation of an alarm sound and writing of an error log, for example.

After S106 or S123, it is determined whether an adjustment color that has been not yet determined in S105 is still remaining (S107). When an adjustment color that has been not yet determined is still remaining (S107: YES), the process is returned to S105 and the degree of positional deviation of the adjustment color that has been not yet determined is determined. When the determination of S105 is completed for all adjustment colors (S107: NO), the automatic acquiring process ends.

[Manual Correction Process]

Figure 6:
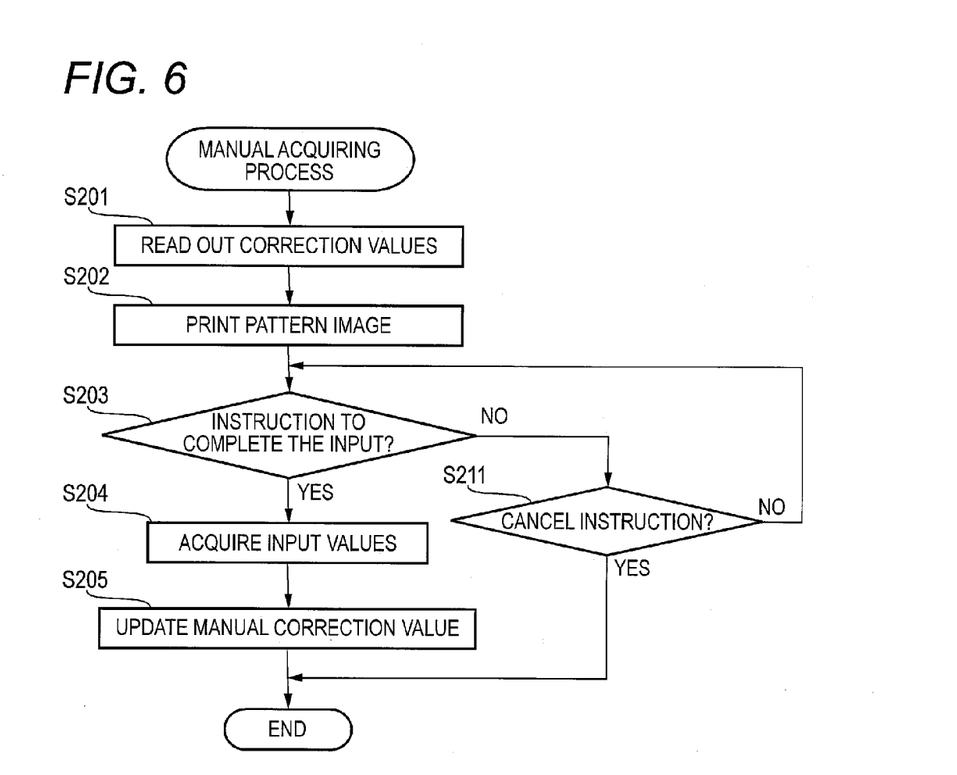
FIG. 6 is a flow chart showing a sequence of a manual acquiring process according to the first illustrative embodiment.

Next, a sequence of the manual acquiring process that is an acquiring process for manual correction will be described with reference to a flow chart of FIG. 6. The manual acquiring process is executed by the CPU 31 when the switch button provided in the operation panel 40 is pushed.

First, the automatic correction value and the manual correction value are read out from the NVRAM 34 (S201). Then, the pattern image 86 is printed on a sheet by using the automatic correction value and the manual correction value, which are read out in S201 (S202). After S202, an input of a correction value by a user is waited. The user inputs a correction value with the operation panel 40.

After that, it is determined whether an instruction to complete the input of the correction value is input (S203). When an instruction to complete the input of the correction value is not input (S203: NO), it is determined whether a cancel instruction is input (S211). When a cancel instruction is also not input (S211: NO), the process is returned to S203. When a cancel instruction is input (S211: YES), the manual acquiring process ends.

When an instruction to complete the input of the correction value is input (S203: YES), input values of the respective adjustment colors, which are input as correction values, are acquired (S204). Then, the manual correction values of the respective adjustment colors are updated (S205). Specifically, the input value is added to the current manual correction value, and the result is stored it in the NVRAM 34 as a new manual correction value. After S205, the manual acquiring process ends.

[Printing Process]

Figure 7:
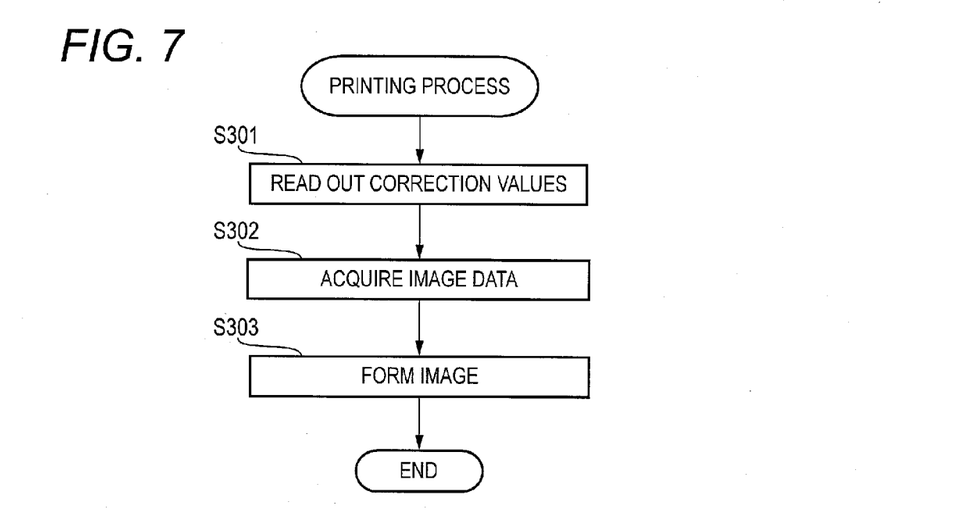
FIG. 7 is a flow chart showing a sequence of a printing process according to the first illustrative embodiment.

Next, a sequence of the printing process of printing image data will be described with reference to a flow chart of FIG. 7. The printing process is executed by the CPU 31 when a print instruction is received from the operation panel 40 or a print job is received from an information processing apparatus connected to the MFP 100.

First, the automatic correction value and the manual correction value from the NVRAM 34 (S301). Then, image data to be printed is acquired (S302). The processes of S301 and S302 may be executed in a reverse order or at the same time.

Then, an actual correction value is determined by using both the automatic correction value and the manual correction value, which are read out in S301, and an image is formed while adjusting the process conditions of the adjustment colors so that positions of images of the adjustment colors are matched at a position of an image of the reference color (S303).

As described above, in the automatic acquiring process, the registration pattern is formed by using the manual correction value as well as the automatic correction value. Therefore, the new automatic correction value obtained in the automatic acquiring process is a value which can appropriately adjust the degree of deviation while reflecting the manual correction value. In the meantime, also in the manual acquiring process, the pattern image is formed by using the automatic correction value as well as the manual correction value. Accordingly, the degree of deviation that is checked in the pattern image is a value indicating an appropriate degree of deviation while reflecting the automatic correction value. Therefore, in the printing process, when acquiring the appropriate correction value, it is required to use both the automatic correction value and the manual correction value. After S303, the printing process ends.

In the first illustrative embodiment, in performing the automatic correction, when the degree of positional deviation exceeds the predetermined range, the manual correction value is reduced and the degree of positional deviation is then re-calculated. Thereby, for example, when a user falsely inputs the manual correction value and the degree of positional deviation thus exceeds the predetermined range, the weight of the manual correction value is reduced, so that it is expected that the degree of positional deviation will become closer to a degree of positional deviation for which the positional deviation can be adjusted. When the degree of positional deviation after the re-calculation is within the predetermined range, it is possible to acquire the automatic correction value. That is, even when there occurs a false input in the manual correction value, it is possible to complement it with an appropriate amount of correction by the automatic correction value. Accordingly, a possibility of improvement in a quality of an image is increased. In the meantime, in a case where the degree of positional deviation exceeds the predetermined range due to the failure of the mark sensor 61 or the conveyance belt 7, it is not expected that the degree of positional deviation will become closer to an appropriate degree of positional deviation even when the manual correction value less affects. Accordingly, it is possible to assume that the problem is not caused due to the false input by a user. In this case, it is possible to notify a detailed handling method by an error message and the like.

Second Illustrative Embodiment

The second illustrative embodiment relates to the manual changing function. In the manual changing function, the automatic and manual correction values are changed at any timing by a panel operation that is performed by a user.

Figure 8:
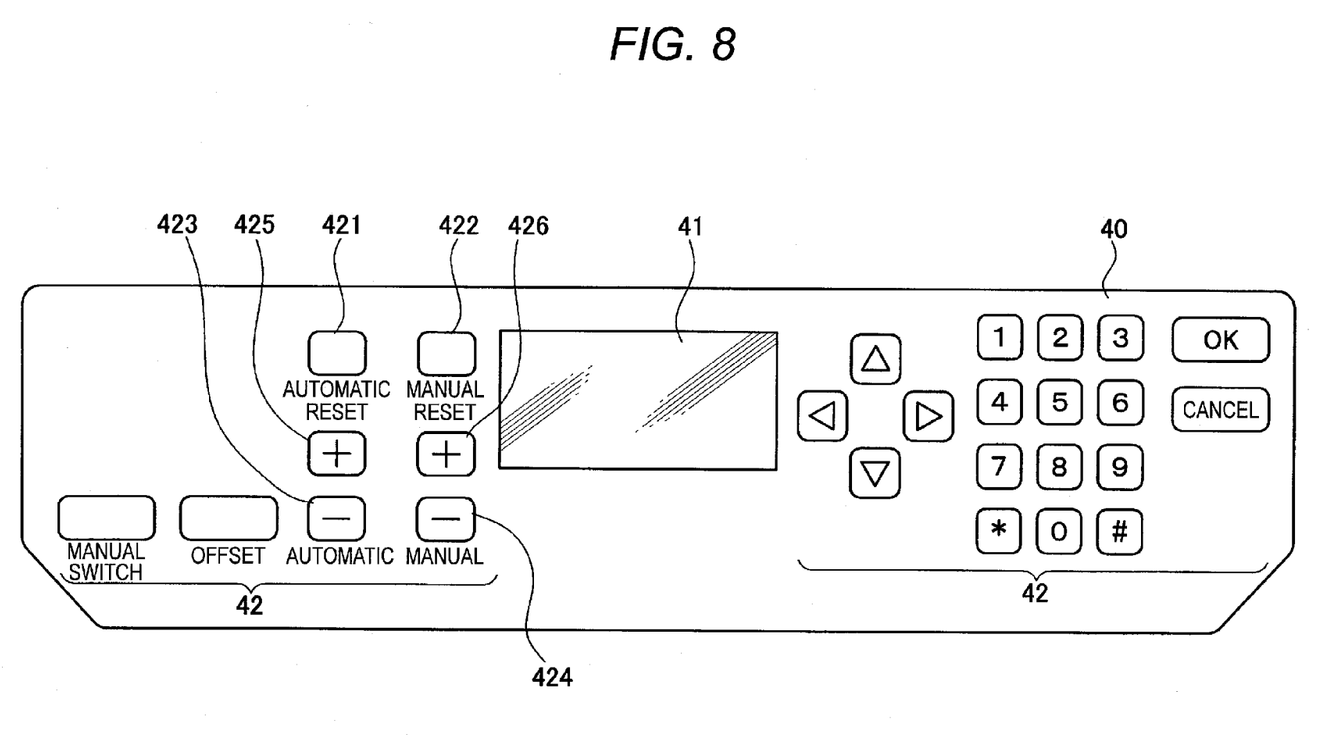
FIG. 8 shows an operation panel according to a second illustrative embodiment.

As shown in FIG. 8, the operation panel 40 of the MFP 100 has a liquid crystal panel 41 that displays an operating status and the like and a button group 42 that includes numerical keypads, an OK button, arrow buttons and the like. The button group 42 includes an automatic correction value initializing button 421 that initializes the automatic correction value, a manual correction value initializing button 422 that initializes the manual correction value, an automatic correction value reducing button 423 that reduces the weight of the automatic correction value, a manual correction value reducing button 424 that reduces the weight of the manual correction value, an automatic correction value weight increasing button 425 that increases the weight of the automatic correction value and a manual correction value weight increasing button 426 that increases the weight of the manual correction value.

Specifically, when it is detected that the automatic correction value initializing button 421 is pushed, the automatic correction value stored in the NVRAM 34 is initialized. In other words, the automatic correction value is returned to the initial degree of deviation that is the degree of positional deviation before shipment of the MFP from a factory. When it is detected that the manual correction value initializing button 422 is pushed, the manual correction value that is stored in the NVRAM 34 is initialized. In other words, the manual correction value is returned to zero.

When it is detected that the automatic correction value reducing button 423 is pushed, the automatic correction value stored in the NVRAM 34 is updated to be 0.8 times of the correction value as a new automatic correction value. Each time the automatic correction value reducing button 423 is pushed, a weight of 0.8 is applied to the current automatic correction value. When it is detected that the manual correction value reducing button 424 is pushed, the manual correction value stored in the NVRAM 34 is updated to be 0.8 times of the correction value as a new manual correction value. Each time the manual correction value reducing button 424 is pushed, a weight of 0.8 is applied to the current manual correction value. It is noted that, the weight that is applied to each correction value is not limited to 0.8. That is, any weight can be used inasmuch as it reduces a weight of each correction value relative to another correction value.

When it is detected that the automatic correction value weight increasing button 425 is pushed, the automatic correction value stored in the NVRAM 34 is updated to be 1.2 times of the correction value as a new automatic correction value. Each time the automatic correction value weight increasing button 425 is pushed, the weight of 1.2 is applied to the current automatic correction value. When it is detected that the manual correction value weight increasing button 426 is pushed, the manual correction value stored in the NVRAM 34 is updated to be 1.2 times of the correction value as a new manual correction value. Each time the manual correction value weight increasing button 426 is pushed, the weight of 1.2 is applied to the current manual correction value. It is noted that the weight that is applied to each correction value is not limited to 1.2. That is, any weight can be used inasmuch as it increases a weight of each correction value relative to another correction value.

That is, in the MFP 100, the automatic correction value and the manual correction value are separately stored in the NVRAM 34. In the second illustrative embodiment, the automatic and manual correction values can be changed separately in response to that respective buttons, which receive the instructions to change the automatic and manual correction values, are pushed. Thereby, for example, when a quality of an image is improved after the operation of reducing the weight of the manual correction value is performed (the manual correction value initializing button 422, the manual correction value reducing button 424 or the automatic correction value weight increasing button 425 is pushed), it is possible to recognize that there was an error in the manual correction value.

Figure 9:
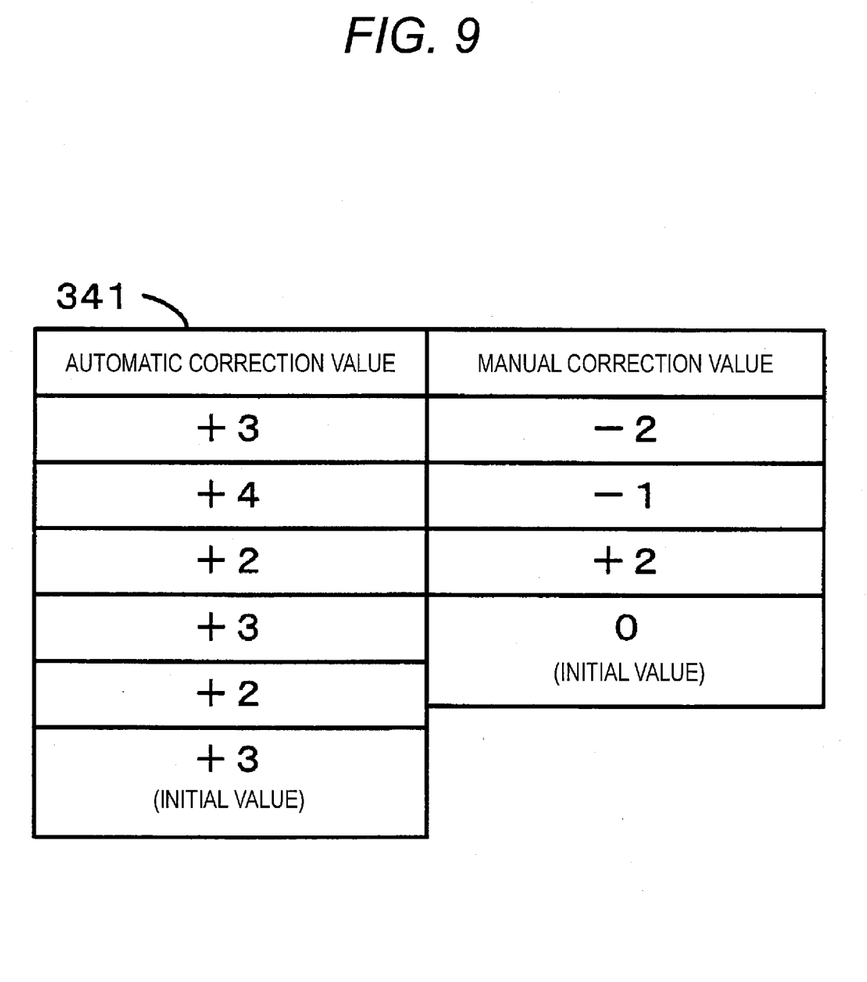
FIG. 9 shows a history information database.

In the meantime, the MFP 100 may include a back button for returning the automatic correction value to a previous value and a back button for returning the manual correction value to a previous value at the operation panel 40 and may perform a changing process of returning the automatic and manual correction values to the past values. In this case, the MFP 100 has a correction value history database 341 that stores past values, as shown in FIG. 9. The correction value history database 341 stores past values for each of the correction values.

When the back button for an automatic correction value is pushed, the automatic correction value is returned to a most recent past value of the automatic correction value that is currently selected. When the back button for a manual correction value is pushed, the manual correction value is returned to a most recent past value of the manual correction value that is currently selected. Thereby, when a quality of an image is improved after the back button for a manual correction value is pushed, for example, it is possible to recognize that there was an error in the manual correction value. In addition, it is possible to determine which update timing of correction value the inappropriateness is caused by sequentially returning the correction value to the past value.

In the above, it may be also possible that the weights, which are respectively applied to the automatic and manual correction values, are individually input and different weights are respectively applied to both the correction values when the OK button is pushed. Thereby, it is possible to change both the correction values at one time and a user can determine which correction value is focused on.

In the second illustrative embodiment, the automatic and manual correction values are changed by the button operations of a user. When the correction value that is an inappropriate value is changed by the button operation, a possibility of improvement in a quality of an image is increased. In the meantime, when the correction value that is an appropriate value is changed, a quality of an image is deteriorated, so that it is expected that the correction value that is an inappropriate value can be specified.

In addition, the automatic or manual correction value is changed when the button is pushed. Accordingly, the operation is easy and the usability is high. In other words, although the respective correction values can be also changed by inputting a numerical value, when it is intended to appropriately change the weight, it is required to know the current correction value. Therefore, a user should endure inconvenience. However, as this illustrative embodiment, in the operation of changing the weight or returning the correction value to the past value, it is possible to appropriately change the increase and decrease of the weight even when a user does not know a specific numerical value of the correction value. Accordingly, the usability is high.

As described above, according to the MFP 100 of the illustrative embodiments, by changing the weight of one of the automatic correction value and the manual correction value or returning one correction value to the past value, it is possible to change the weights of both the correction values when calculating the actual correction value. Accordingly, the weight of the inappropriate correction value is reduced, for example, so that it is expected that an appropriate value will be acquired as an actual correction value. In the meantime, when the appropriate correction value is changed, the deterioration of the image quality could be accelerated. In this case, it is expected that the inappropriate correction value will be specified. Accordingly, it is possible to easily adjust the actual correction value that is obtained from the automatic correction value and the manual correction value.

While the present invention has been shown and described with reference to certain illustrative embodiments thereof, it will be understood by those skilled in the art that various changes in form and details may be made therein without departing from the spirit and scope of the invention as defined by the appended claims.

For example, the image forming apparatus is not limited to the MFP. In other words, the inventive concept of the present invention can be applied to any apparatus having a printing function such as printer, copier, FAX apparatus and the like. In addition, the image forming apparatus is not limited to an electro-photographic type and may be an inkjet type. Further, the MFP 100 in the above illustrative embodiments is a direct transfer tandem type. However, the MFP may be an intermediate transfer type or four-cycle type.

In the above illustrative embodiments, the MFP has the color printing function. However, the inventive concept of the present invention can also be applied to a monochrome printing apparatus inasmuch as it performs the positional deviation correction or density deviation correction.

In the above illustrative embodiments, the pattern image is printed on the sheet when performing the manual acquiring process. However, a configuration of receiving an input from a user without performing such printing may be also possible. In addition, when printing the pattern image, a type of the sheet may be designated.

In the above illustrative embodiments, the final actual correction value is calculated by using the automatic correction value and the manual correction value. However, the parameters for calculating the actual correction value are not limited thereto. For example, in the illustrative embodiments, after the automatic correction, the content of the automatic correction has the priority over the manual correction value that is input by the user. Accordingly, even when the user wants to intentionally cause the deviation, the content thereof is not reflected. Thus, it may be possible to enable an offset value, which is a correction value for reflecting the user's preference, to be input and to calculate the actual correction value by using the offset value in addition to the automatic correction value and the manual correction value.

The present invention provides illustrative, non-limiting embodiments as follows:

An image forming apparatus includes: an automatic acquiring unit which is configured to form a mark for detecting at least one of positional deviation and density deviation and acquire a degree of deviation by measuring the mark; a manual acquiring unit which is configured to receive a user input and acquire a correction value based on the user input; an image forming unit which is configured to form an image based on an actual correction value, wherein the actual correction value is determined based on an automatic correction value which is specified based on the degree of deviation acquired by the automatic acquiring unit and a manual correction value which is the correction value acquired by the manual acquiring unit; and a changing unit which is configured to execute at least one of a first changing process and the second changing process, the first changing process including applying a weight to at least one of the automatic correction value and the manual correction value, the second changing process including changing at least one of the automatic correction value and the manual correction value into a past correction value.

The image forming apparatus according to the above configuration forms an image based on both the automatic correction value and the manual correction value. The image forming apparatus can change at least one of the automatic correction value and the manual correction value. Specifically, regarding the changing process, the image forming apparatus can execute at least one of a first changing process of applying a weight to at least one of the automatic correction value and the manual correction value and a second changing process of changing one of the automatic correction value and the manual correction value into a past correction value (which may be an initial value). A condition for executing the changing process may include detecting an inappropriate value as a correction value and a user instruction through a panel operation, for example.

That is, according to the image forming apparatus, at least one of the automatic correction value and the manual correction value is applied with a weight or is changed into the past value, so that relative weight of the correction values in the actual correction value is changed. Thereby, for example, by reducing the weight of the correction value that is an inappropriate value, it is expected that the actual correction value will become closer to an appropriate value. In contrast, when the weight of the correction value that is an inappropriate value is increased, the deterioration of the image quality is accelerated. That is, it is expected that the inappropriate correction value can be specified.

The first changing process may apply a weight for reducing a relative weight of the manual correction value with respect to the automatic correction value. In addition, the second changing process returns the manual correction value to the past correction value thereof. A problem of the actual correction value is caused in many cases due to a false input of a user when acquiring the manual correction value. Accordingly, it is expected that an appropriate actual correction value would be acquired by changing the manual correction value.

The automatic acquiring unit may be configured to form the mark by using at least the manual correction value, and the changing unit may be configured to execute the first changing process or second changing process when the degree of deviation acquired by the automatic acquiring unit exceeds a predetermined range. For a case where the mark for automatic correction is formed by using the manual correction value, when the degree of deviation acquired exceeds the predetermined range, it is difficult to specify whether a problematic factor is in the automatic correction value or manual correction value. Accordingly, when the automatic correction value exceeds the predetermined range, the changing process is executed, so that it is expected that the problem will be rapidly solved.

The second changing process may initialize one of the automatic correction value and the manual correction value to an initial value thereof. The initial value of the automatic correction value may be a value, on which an inherent characteristic of the apparatus measured at manufacturing is reflected. In returning the correction value to the past value, when one correction value is returned to its initial value, if a problematic factor is in the initialized correction value, the problem is solved. Therefore, it is possible to easily specify whether the inappropriate factor is in the automatic correction value or manual correction value.

The image forming apparatus may include a storage unit which is configured to store the past correction value of at least one of the automatic correction value and the manual correction value, and the second changing process may return one of the automatic correction value and the manual correction value to the past correction value stored in the storage unit. By changing the correction value to the past correction value, it is possible to easily determine that the inappropriateness has been caused due to which update of the correction values.

The automatic acquiring unit may be configured to form the mark based on at least one of the automatic correction value and the manual correction value. It is expected that the correction value will be larger due to an aging change. Accordingly, it is possible to easily cope with the aging change by using the actual correction value at this time.

Additionally, the image forming unit may be configured to form a pattern image to be referred to at the user input in the manual acquiring unit. By this configuration, it is possible to perceive a degree of deviation that actually occurs on a printing sheet and to thus input the manual correction value depending on types of the sheet.

What is claimed is:

1. An image forming apparatus comprising:
   an image forming unit;
   a sensor;
   a processor; and
   a memory storing instructions that, when executed by the processor, cause the image forming apparatus to:
   control the image forming unit to form a mark for detecting at least one of positional deviation and density deviation and control the sensor to measure the mark to acquire a degree of deviation;
   receive a user input and acquire a correction value based on the user input;
   control the image forming unit to form an image based on an actual correction value, wherein the actual correction value is determined based on an automatic correction value which is specified based on the acquired degree of deviation and a manual correction value which is the acquired correction value; and
   execute a changing process including changing one of the automatic correction value and the manual correction value into a past correction value.

2. The image forming apparatus according to claim 1, wherein the changing process returns the manual correction value to the past correction value thereof.

3. The image forming apparatus according to claim 1, wherein the image forming unit is controlled to form the mark by using at least the manual correction value, and wherein the changing process is executed when the acquired degree of deviation exceeds a predetermined range.

4. The image forming apparatus according to claim 1, wherein the changing process initializes one of the automatic correction value and the manual correction value to an initial value thereof.

5. The image forming apparatus according to claim 4, wherein the initial value of the automatic correction value is a value, on which an inherent characteristic of the apparatus measured at manufacturing is reflected.

6. The image forming apparatus according to claim 1, further comprising:
a storage unit configured to store the past correction value of at least one of the automatic correction value and the manual correction value,
wherein the changing process returns one of the automatic correction value and the manual correction value to the past correction value stored in the storage unit.

7. The image forming apparatus according to claim 1, wherein the image forming unit is controlled to form the mark based on at least one of the automatic correction value and the manual correction value.

8. The image forming apparatus according to claim 1, wherein the memory further stores instructions that, when executed by the processor, cause the image forming apparatus to control the image forming unit to form a pattern image to be referred to at receiving the user input.

9. The image forming apparatus according to claim 8, wherein the image forming unit is controlled to form the pattern image based on at least one of the automatic correction value and the manual correction value.

10. An image forming apparatus comprising:
an image forming unit;
a sensor;
a processor; and
a memory storing instructions, when executed by the processor, causing the apparatus to:
control the image forming unit to form a mark for detecting at least one of positional deviation and density deviation and control the sensor to measure the mark to acquire a degree of deviation;
receive a user input and acquire a correction value based on the user input;
control the image forming unit to form an image based on an actual correction value, wherein the actual correction value is determined based on an automatic correction value which is specified based on the acquired degree of deviation and a manual correction value which is the acquired correction value; and
execute a changing process including applying a weight to at least one of the automatic correction value and the manual correction value,
wherein the image forming unit is controlled to form the mark by using at least the manual correction value, and
wherein the changing process is executed when the acquired degree of deviation exceeds a predetermined range.

11. The image forming apparatus according to claim 10, wherein the changing process applies a reducing weight for reducing a relative weight of the manual correction value with respect to the automatic correction value.

12. The image forming apparatus according to claim 11, wherein after executing the changing process, the image forming unit is controlled to again form the mark for detecting at least one of positional deviation and density deviation based on at least the manual correction value applied with the reducing weight, and the sensor is controlled to measure the mark to acquire a second degree of deviation, and
wherein the changing process is executed to including applying a second reducing weight for further reducing the relative weight of the manual correction value with respect to the automatic correction value when the acquired second degree of deviation exceeds the predetermined value.

13. The image forming apparatus according to claim 10, wherein the memory further stores instructions that, when executed by the processor, cause the image forming apparatus to control the image forming unit to form a pattern image to be referred to at receiving the user input.

14. The image forming apparatus according to claim 13, wherein the image forming unit is controlled to form the pattern image based on at least one of the automatic correction value and the manual correction value.

15. An image forming apparatus comprising:
an image forming unit;
a sensor;
a processor; and
a memory storing instructions that, when executed by the processor, cause the image forming apparatus to:
control the image forming unit to form a mark for detecting at least one of positional deviation and density deviation and control the sensor to measure the mark to acquire a degree of deviation;
receive a user input and acquire a correction value based on the user input;
control the image forming unit to form an image based on an actual correction value, wherein the actual correction value is determined based on an automatic correction value which is specified based on the acquired degree of deviation and a manual correction value which is the acquired correction value; and
receive, through a user input, an instruction to apply a weight to at least one of the automatic correction value and the manual correction value, and execute a changing process including applying a weight to at least one of the automatic correction value and the manual correction value based on the received instruction.

16. The image forming apparatus according to claim 15, wherein the changing process applies a weight for reducing a relative weight of the manual correction value with respect to the automatic correction value.

17. The image forming apparatus according to claim 15, wherein the image forming unit is controlled to form the mark by using at least the manual correction value, and
wherein the changing process is executed when the acquired degree of deviation exceeds a predetermined range.

18. The image forming apparatus according to claim 15, wherein the image forming unit is controlled to form the mark based on at least one of the automatic correction value and the manual correction value.

19. The image forming apparatus according to claim 15, wherein the memory further stores instructions, when executed by the processor, causing the apparatus to control the image forming unit to form a pattern image to be referred to at receiving the user input.

20. The image forming apparatus according to claim 19, wherein the image forming unit is controlled to form the pattern image based on at least one of the automatic correction value and the manual correction value.

* * * * *